United States Patent Office 3,226,747
Patented Jan. 4, 1966

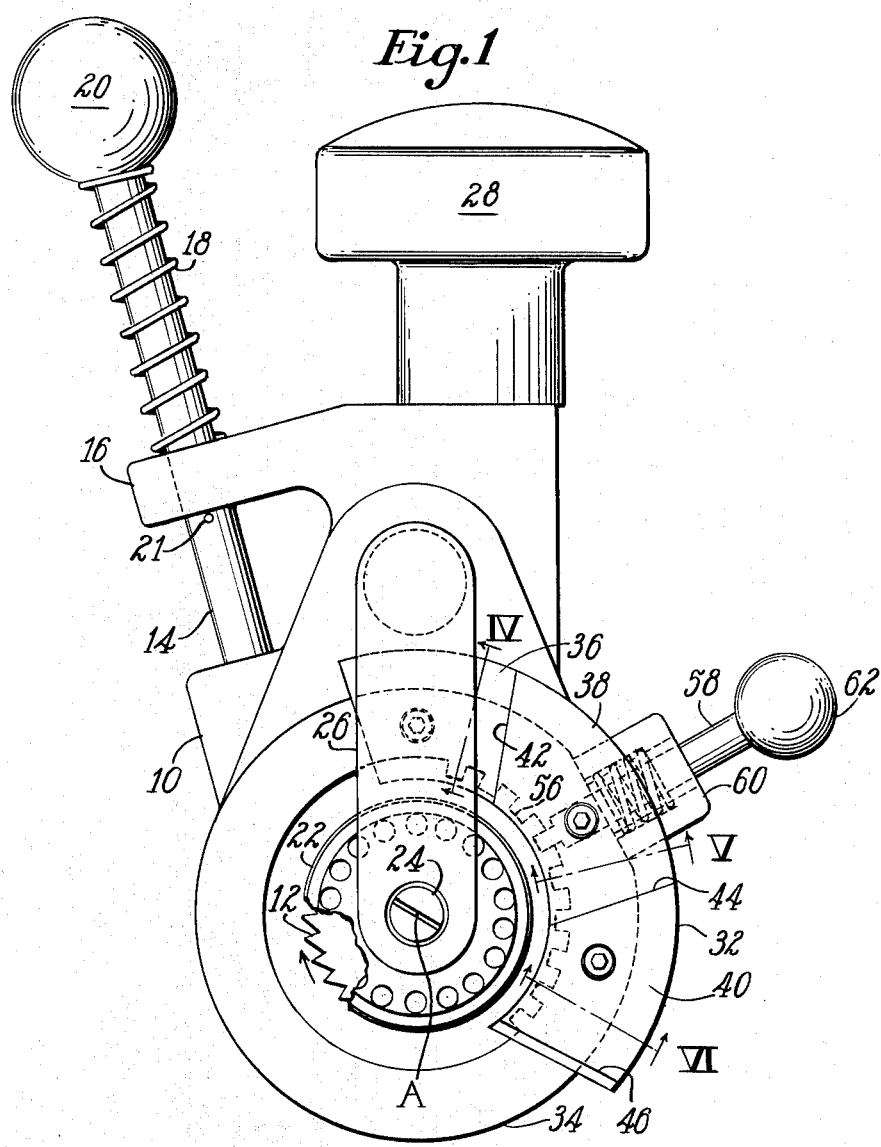

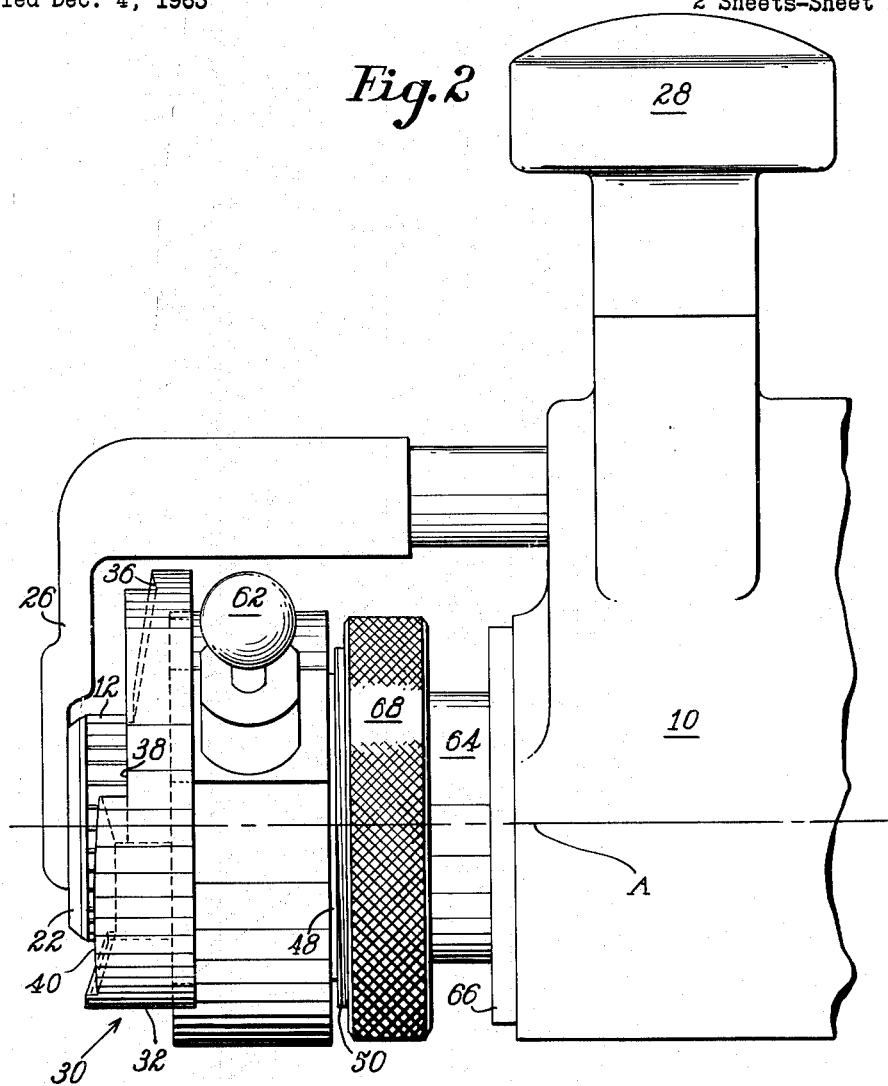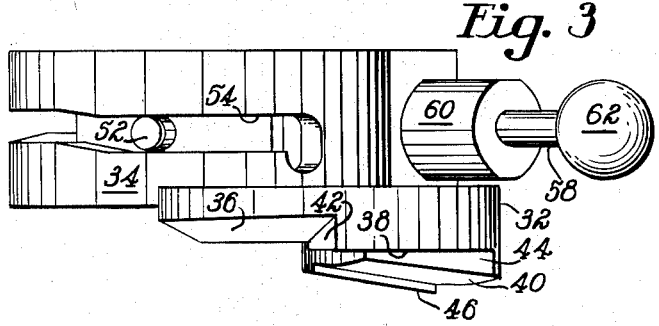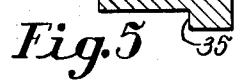

3,226,747
HEEL LIFT TRIMMING MACHINES
Brian W. Cox and Peter L. Stapleton, Leicester, England, assignors to United Shoe Machinery Corporation, Boston, Mass., a corporation of New Jersey
Filed Dec. 4, 1963, Ser. No. 327,911
Claims priority, application Great Britain, Mar. 28, 1963, 12,245/63
5 Claims. (Cl. 12—88)

This invention relates generally to improvements in top lift trimming machines and is more particularly directed to apparatus which may be selectively positioned to provide an accurate location for a top lift being trimmed by the cutter of such a machine.

There is disclosed in United States Letters Patent 1,685,-811, issued October 2, 1928, upon an application of Joseph Gouldbourn et al., a trimming machine suitable for operating upon top lifts in the quantity manufacture of shoes. The Gouldbourn machine includes an adjustable plate adapted to be engaged by the tread surface of a top lift. The plate is positioned to define an edge angle with the periphery of the trimming cutter in accordance with the style of the shoe being operated upon. Considerable time required for accurate adjustment of the plate is warranted when the top lifts of large numbers of shoes are to be trimmed to the same angle. By contrast, a shoe repairer for whom the present machine is more particularly suited frequently trims only a few top lifts at a time and in the interest of efficiency a machine intended for such use is preferably quickly changeable to adapt to various edge angles of different shoe styles.

It is accordingly an object of the present invention to render more efficient the changeover in edge angle produced by top lift trimming machines.

Another object is to improve the accuracy of edge angle produced by top lift trimming machines suitable for the shoe repair trade.

In the achievement of the foregoing objects one of the features of the invention resides in a top lift trimming machine including a cutter rotatable about an axis in combination with a novel multiple tread rest and heel support. The multiple tread rest consists of a plurality of tread receiving surfaces each oriented at a different angle to the axis of the cutter. Typically three surfaces may be included to provide an acute, obtuse, or a right edge angle on the lift. Associated with each tread locating surface is a heel supporting shoulder to support the heel against the thrust of the trimming cutter.

In accordance with another feature of the invention the multiple tread rest and heel support is in the form of an arcuate plate mounted to be indexed angularly about the axis of the cutter to bring a predetermined one of the tread receiving surfaces into operative relationship with the cutter. The arcuate plate is mounted on a collar carrying a plunger which is engaged in one of a plurality of sockets angularly spaced about the axis of the cutter.

In order that the above and others of the various objects of the invention may be more fully understood there will now be given with reference to the accompanying drawings a detailed description of an illustrative machine embodying features of the invention. It is to be clearly understood however that the illustrative machine is selected for description merely by way of exemplification of the invention and not by way of limitation thereof.

In the accompanying drawings:

FIG. 1 is an end view of a cutter shaft and associated parts of the illustrative machine;

FIG. 2 is a front elevation of the parts of the machine shown in FIG. 1;

FIG. 3 is a plan view of a combined tread rest and heel support of the illustrative machine;

FIG. 4 is a section on line IV—IV of FIG. 1;

FIG. 5 is a section on line V—V of FIG. 1; and

FIG. 6 is a section on line VI—VI of FIG. 1.

The illustrative machine is a machine for trimming the top lift of a heel on a shoe and is of a type similar to the machine of the above identified patent having a head 10 having bearings (not shown) for a horizontally extending shaft which is driven by suitable means (not shown). A toothed trimming cutter 12 is secured on the left end portion of the shaft by means of a split sleeve having a tapered bore which sleeve is placed in the bore of the cutter and is forced on to a tapered portion of the shaft by a screw threaded into the end of the shaft so as to expand the sleeve and cause it to grip the shaft and cutter. This is common practice and details are not therefore shown in the drawings. A rod 14 is slidably mounted in coaxial bores provided in a lug 16 and in the head 10, a lower end portion of the rod being in a position to engage notches in the shaft to hold the shaft stationary during the replacement of the cutter. A spring 18 surrounds the rod between the lug 16 and a handle 20 of the rod and normally holds the rod out of engagement with the shaft, the rod being retained against total withdrawal by a pin 21. An edge guide 22 is freely mounted on a pivot 24 carried by a supporting arm 26 a stem of which is locked in the head by means of a handle 28.

A member generally indicated at 30 combining the functions of tread rest and heel support comprises an arcuate plate 32 which is secured to a ring 34 and is located concentrically about the axis A of the cutter shaft by means of an arcuate shoulder 35. The operative portion of the member 30 is provided by three surfaces 36, 38, 40 inclined at different angles to the axis of the cutter shaft. By holding the shoe with the tread surface of the top lift in engagement with a chosen one of these surfaces the top lift may be trimmed so that the angle between the tread surface and the edge, the edge angle, is a right angle or alternatively slightly acute or slightly obtuse.

To provide a support for the heel by engagement of the edge of the top lift, shoulders 42, 44, 46 are provided adjacent to the surfaces 36, 38, 40 respectively. To avoid undue restriction of the size of heel with which the member can be successfully used the shoulders 42 and 44 are formed by the surfaces 38 and 36 being progressively set back in a direction axial of the shaft.

To enable each face to be brought into an operative position convenient to the operator the ring 34 is mounted for limited rotation on a flanged bushing 48, the flange 50 of which is threaded around its periphery, said rotation being limited by a peg 52 which is secured in the bushing and projects into a slot 54 which extends through a portion of the periphery of ring 34 and is of sufficient length to allow the necessary movement to bring each of the surfaces 36, 38, 40 into operative position as desired.

In order that the portions of the surfaces 38 and 36 adjacent to the cutter shall, when brought into operative position, be in the same position axially of the cutter, the slot 54 is so shaped as to cause the ring 34 by engagement of the peg 52 with the sides of the slot, to be cammed along the bushing 48 into the appropriate axial relation.

However, if the prevailing fashion is such that the machine is not required to trim heels having a top lift width of more than, for example, ⅝", the surfaces 38 and 36 need not be progressively set back but the shoulders between the surfaces could be formed by narrow strip-like projections extending outwardly from the bore of the ring to its periphery. In these circumstances the slot 54 may be straight and serve only to retain the ring in fixed axial relation to the cutter.

For the purpose of retaining the ring 34 in a desired position a number of notches 56 are provided in the periphery of the portion of the bushing 48 on which the ring rotates, any one of the said notches being engageable by an end portion of a spring plunger 58 provided in a housing 60 secured in the ring, a handle 62 being provided for disengaging the plunger from the notches when it is desired to move the ring to a different position.

To provide adjustment of the member 30 axially of the cutter shaft when operating on top lifts of different thicknesses, the bushing 48 is slidably mounted on a flanged sleeve 64, and keyed to prevent rotary movement thereon. A flanged portion 66 of the sleeve is secured to the head 10 by screws (not shown) so that the cutter shaft extends concentrically therethrough. A knurled ring 68 surrounds the sleeve and is rotatable thereon while being restricted against axial movement by a circlip (not shown). The knurled ring has an internally threaded portion which engages the threaded flange of the bushing 48 so that rotation, by the operator, of the knurled ring advances or retracts the flanged bushing 48 together with the member 30 mounted thereon.

In operation, the member 30 is initially adjusted by rotating the knurled ring 68 to suit the thickness of the top lift being operated upon. Then by withdrawing the plunger 58 from engagement with the bushing 48 the ring 34 is rotated by the operator to bring into operative position one of the surfaces 36, 38, or 40 according to whether the top lift is to be trimmed square with the tread face or bevelled in either direction. The plunger 58 is then allowed to re-engage, and the machine is ready for operation.

The foregoing description of the embodiment of the invention has been given for purposes of illustration only and is therefore not to be construed as a limitation of the invention which is suitable to being employed in numerous variations readily apparent to those having ordinary skill in the art.

Having thus disclosed our invention, what we claim as new and desire to secure by Letters Patent of the United States is:

1. A machine for trimming the edge of a top lift attached to a shoe to one of a plurality of predetermined edge angles comprising a rotary cutter, a plurality of tread rests each having a tread engaging surface defining a different one of the edge angles with the axis of the cutter, a heel support integral with each tread rest, and means for bringing a selected tread rest and its associated heel support into operative relationship with the cutter.

2. A machine for trimming the edge of a top lift attached to a shoe to one of a plurality of predetermined edge angles comprising a rotary cutter, a single plate formed with a plurality of tread engaging surfaces each oriented at one of the edge angles with the axis of the cutter, a shoulder terminating each surface to provide a heel support, and means for positioning the plate to bring a selected tread receiving surface into operative relationship with the cutter.

3. A machine for trimming the edge of a top lift attached to a shoe to one of a plurality of predetermined edge angles comprising a rotary cutter, an arcuate plate mounted about the periphery of the cutter and formed with a plurality of tread engaging surfaces each oriented at one of the edge angles with the axis of the cutter, means for angularly orienting the plate about the cutter axis and means for simultaneously positioning the plate along the axis of the cutter thereby to bring the selected surface into operative relationship with the cutter.

4. A machine for trimming the edge of a top lift attached to a shoe to one of a plurality of predetermined edge angles comprising a rotary cutter, an arcuate plate mounted about the periphery of the cutter and formed with a plurality of tread engaging surfaces each oriented at one of the edge angles with the axis of the cutter, a heel support associated with each tread receiving surface and means including a plurality of sockets each defining an angular position of the plate and a plunger selectively engageable in any one of the sockets to bring a selected one of the surfaces and its associated heel support into operative angular relation with the cutter.

5. A machine for trimming the edge of a top lift attached to a shoe to one of a plurality of predetermined edge angles comprising a rotary cutter, an arcuate plate mounted about the periphery of the cutter and formed with a plurality of tread engaging surfaces each oriented at one of the edge angles with the axis of the cutter, a heel support associated with each tread receiving surface, means including a plurality of sockets each defining an angular position of the plate and a plunger selectively engageable in any one of the sockets to bring a selected one of the surfaces and its associated heel support into operative relation with the cutter, and cam means for adjusting the position of the plate along the axis of the cutter in accordance with the socket engaged by the plunger.

References Cited by the Examiner

UNITED STATES PATENTS

| | | | |
|---|---|---|---|
| 1,685,811 | 10/1928 | Gouldbourn et al. | 12—88 |
| 1,774,887 | 9/1930 | Hummel | 12—88 |
| 1,788,545 | 1/1931 | Schildknecht | 12—88 |

JORDAN FRANKLIN, *Primary Examiner.*